July 6, 1965  D. E. LIPPKE  3,192,900
AUTOMATIC RELEASE MECHANISM FOR MILKING APPARATUS
Filed Nov. 13, 1962  2 Sheets-Sheet 1

INVENTOR.
DONALD E. LIPPKE
BY
*Andrus & Starke*
ATTORNEYS

July 6, 1965 D. E. LIPPKE 3,192,900
AUTOMATIC RELEASE MECHANISM FOR MILKING APPARATUS
Filed Nov. 13, 1962 2 Sheets-Sheet 2

INVENTOR.
DONALD E. LIPPKE
BY
Andrus & Starke
ATTORNEYS

United States Patent Office 3,192,900
Patented July 6, 1965

3,192,900
AUTOMATIC RELEASE MECHANISM FOR MILKING APPARATUS
Donald E. Lippke, Delavan, Wis., assignor, by mesne assignments, to Sta-Rite Products, Inc., Delavan, Wis., a corporation of Wisconsin
Filed Nov. 13, 1962, Ser. No. 236,954
8 Claims. (Cl. 119—14.08)

This invention relates to a milking apparatus and more particularly to a milking apparatus having an automatic release device for breaking the vacuum applied to an animal's teats after the flow of milk ceases.

An automatic release mechanism for use with a milking apparatus is employed to break the vacuum applied to a cow's teats after the flow of milk has ceased in order to prevent injury to the cow. The conventional automatic shutoff device includes a bucket or bowl having an open top enclosed by a lid. Four cups or receptacles are mounted on the lid and each cup has a milk inlet nipple which is connected to a teat cup. The cups are provided with outlets which communicate with the bucket or bowl, and each outlet is adapted to be closed off by a valve associated with a float.

In order to initially establish the vacuum to the teat cups and start the flow of milk, a lifting mechanism is employed to lift the valve from the outlets. Once the milk is flowing into the cups, the floats rise and engage the valves to thereby maintain the valves in the open position. When the flow of milk ceases, the floats will lower thereby enabling the valve to reseat on the outlets and break the vacuum to the teat cups.

The conventional automatic shutoff device includes an operating mechanism for lifting the valves which is normally located within the bucket or bowl in the milk zone. Devices of this type include a substantial number of moving parts and require cleaning after each milking operation. Because of the location and number of components involved, it is often difficult to maintain the operating mechanism in the degree of cleanliness required by sanitary codes.

The present invention is directed to a milking apparatus having automatic shutoff device in which the valves are initially opened to establish the vacuum to the teat cups by a mechanism located on the outside of the bowl or bucket. More specifically, each valve is in the form of a ball or sphere which is seated on the upper end of an outlet tube in the cup. To initially establish the vacuum to the teat cups, the balls are moved or displaced from the seat by an actuating pin which extends through the cover of the cup. The pins are mounted for sliding, vertical movement within the covers and the lower end of each pin is provided with an enlarged head which is normally located out of contact with the ball valve and below the horizontal centerline of the ball valve.

The upper end of each pin is connected to an actuating mechanism which is mounted on the lid and is operably connected to the handle employed for carrying the lid. By moving the handle upwardly, the actuating pins are correspondingly moved upwardly to bring the heads of the pins into engagement with the ball valves to thereby move the ball valves from the valve seats and establish the vacuum to the teat cups.

The use of the vertically moving pins, which engage the ball valves to establish the vacuum, provides a simple and inexpensive valve actuating mechanism which minimizes the number of moving parts. In addition the actuating mechanism is located entirely out of the milk zone which simplifies the cleaning procedure.

The valve actuating mechanism is integral with the lid handle, and when the lid is lifted from the bucket at the end of the milking operation, the lifting pins are automatically moved to the upper or manual position and the lid can then be removed from the bucket or bowl. In the conventional type of shutoff mechanism, the actuating mechanism is separate from the handle so that it is necessary to move the actuating mechanism to the manual position before the lid can be removed from the bowl or bucket.

As an additional feature, an indicator is provided which visually indicates to the operator whether the actuating pins are in the upper or manual position or in the lower or automatic position.

Other objects and advantages will appear in the course of the following description.

The drawings illustrate the best mode presently contemplated for carrying out the invention.

Figure 1:
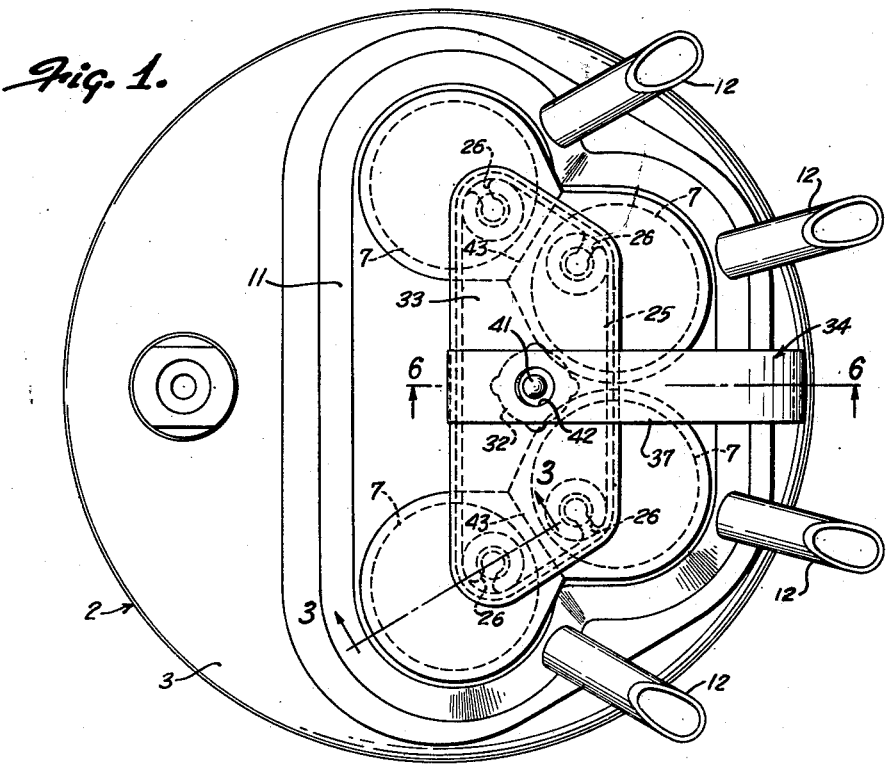
FIG. 1 is a plan view of the lid assembly including the milk shutoff device of the invention.
Figure 2:
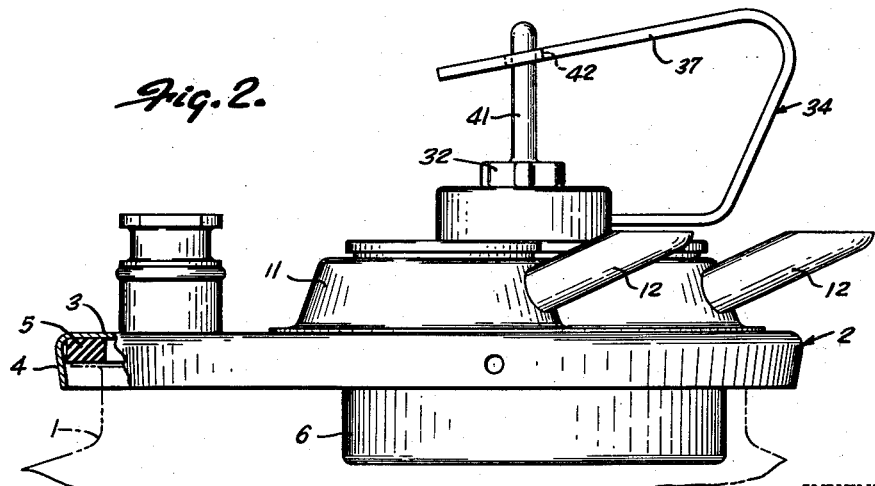
FIG. 2 is a side elevation of the lid assembly.

The drawings illustrate a milking apparatus having an automatic shutoff device which serves to automatically break the vacuum to the teat cups after the flow of milk has ceased in order to prevent injury to the cow's teats. The structure includes a bucket or bowl 1 having an open top which is enclosed by a lid 2. The bucket 1, as shown, is connected to a suitable source of vacuum, and is a self-containing bucket in which the milk is collected. However, it is contemplated that a smaller bowl may also be used in place of the bucket and the bowl may have a discharge outlet connected to pipeline milking system.

The lid 2 comprises a lower lid plate 3 having a downwardly extending flange 4 which is located around the neck of the bucket 1 and sealed to the neck by a gasket 5.

The central portion of the lid plate is provided with a depression or well 6 and four cups or receptacles 7 are mounted within the well. Each cup is provided with a central, vertical outlet tube 8 and the lower surface of each cup is also provided with a drain hole 9. The well 6 is formed with a series of openings 10 and the lower end of the outlet tube 8 and the drain hole 9 of each cup 7 are in alignment with the respective openings 10 so that the outlet tubes and drain holes communicate with the bucket 1.

In addition to the lower lid plate 3, the lid also includes an upper plate 11 which is secured to the plate 3 and to the upper edges of the cups 7. The plate 11 slopes downwardly from the upper edges of the cups providing a smooth upper surface for the lid and eliminating the recesssed areas between the cups which are normally present in a conventional milking device of this type. A milk inlet nipple 12 is brazed or otherwise secured within aligned openings in the cup 7 and upper plate 11. The spaced connections of the nipple 12 to the cups 7 and plate 11 provide a strong attachment of the nipples to the lid and prevent the nipples from being accidentally broken off by the cow.

The top of each cup 7 is enclosed by a cap 13 and the cap is sealed to the wall of the cup by an annular seal 14. The caps 13 are generally made of a transparent plastic material and each cap is provided with a small vent hole 15.

An annular float 16 is disposed around the central outlet tube 8 in each cup 7 and is adapted to rise and fall with the level of milk in the cup. The upper end of tube 8 defines a valve seat 17 which is adapted to be closed off by a ball valve 18. The ball valve 18 is composed of a lightweight material, such as plastic or the like.

The float 16 is provided with a series of spaced prongs 19 which extend upwardly from the float and are located around the outlet tube 8. As the float rises, the prongs 19 engage the ball valve 18 and hold the valve in the open position. Milk in the cup can then flow between the prongs 19 into the outlet tubes 8.

Figure 3:
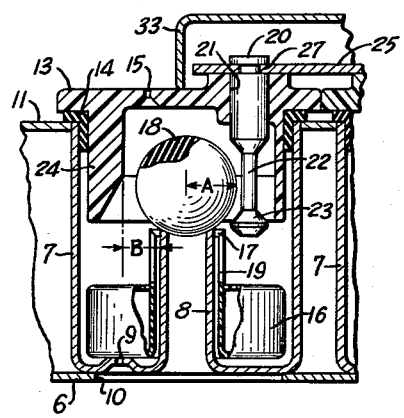
FIG. 3 is a vertical section taken along lines 3—3 of FIG. 1 and showing the float and valve in the closed position before milk flows into the cup.
Figure 4:
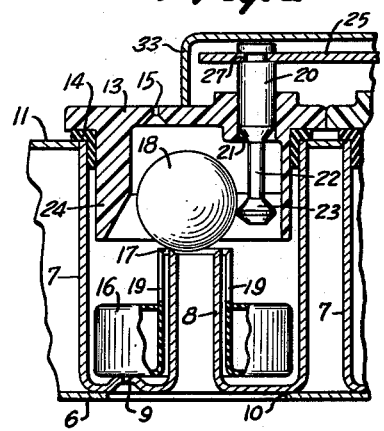
FIG. 4 is a view similar to FIG. 3 showing the position of the ball valve after being unseated by the actuating pin.

To lift the ball valves 18 from the respective seats 17 at the beginning of the milking operation and establish a vacuum to the teat cups, a pin 20 extends through an opening 21 in each cap 13. The pin 20 is slidable within the opening 21 in the cap, and the central portion of the pin 22, which is located laterally of the center of the ball 18 has a reduced diameter and is spaced from the ball valve. In addition, the lower end of pin 20 is provided with an enlarged head 23, and the head is located in spaced relation to the ball 18 and below a horizontal plane passing through the center of the ball. When the pin 20 is in its lowermost position, as shown in FIG. 3, the periphery of the ball 18 overlaps the periphery of the head 23 of pin 20 so that when the pin 20 is moved vertically, the head 23 will engage the ball and move the ball 18 from the valve seat 17, as shown in FIG. 4.

To prevent the complete displacement of ball 18 from the seat 17, and ensure the return of the ball to the seat, the cap is provided with an annular skirt or wall 24, which is located radially outward of the axis of the cup 7. As best shown in FIG. 3, the radius A of the ball 18 is greater than the distance B between the outer edge of the tube and the inner surface of the skirt 24 so that the ball will fall by gravity to its seated position on valve seat 17.

The pins 20 are moved vertically within the openings 21 by an operating mechanism which is located on the upper surface of the lid 2. The operating mechanism includes a plate 25 which is attached to the outer end of each of the pins 20. The periphery of plate 25 is provided with a series of slots 26 and the slots are engaged with grooves 27 formed in the upper ends of the pins. With this connection, the pins 20 will be raised and lowered in accordance with vertical movement of the plate 25 and yet the pins can be readily detached from the plate for cleaning purposes.

Figure 6:
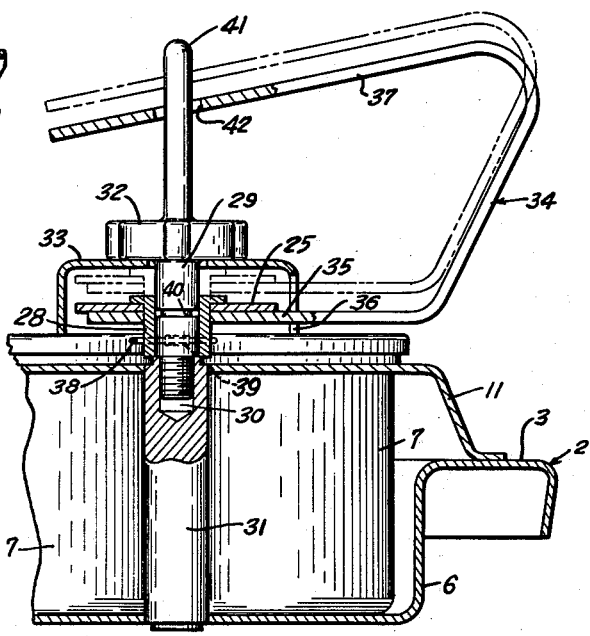
FIG. 6 is a section taken along lines 6—6 of FIG. 1.

As best shown in FIG. 6, the plate 25 is secured to a bushing 28 which is slidable on a vertical post 29. The lower end of the post 29 is threaded within an opening 30 formed in the upper end of a central column 31 and the lower end of the column is secured within an opening in the well 6. A knob 32 is provided on the central portion of post 29 so that the post can be readily threaded down into the opening 30.

The lifting pins 20, as well as the plate 25, are enclosed by a cover 33 which has a similar contour to that of plate 25, but extends outwardly beyond the periphery of the plate. The cover 33 not only prevents dirt and other foreign material from coming in contact with the pins 20 and other operating mechanism, but also serves to retain the caps 13 on the cup 7. In this regard, the hand knob 32 bears against the upper surface of the cover 33 and forces the cover flange downwardly against the caps 13.

The plate 25 and pins 20 are adapted to be raised and lowered by a handle 34. The lower end 35 of the handle 34 is connected to the bushing 28 beneath plate 25. The handle extends outwardly through a slot 36 in cover 33 and is provided with a reverse bend 37. By moving the handle 34 in a vertical direction, the bushing 28 and plate 25, as well as the pins 20, will be raised.

As previously mentioned, raising the pins 20 serves to displace the ball valves 18 from the valve seats to thereby establish the vacuum to the teat cups.

The bushing 28 is held in the upper position by a spring 38 which is disposed around the bushing 28 and extends through notches 39 provided in opposite portions of the bushing. When the handle 34 and bushing 28 are raised, the spring 38 is adapted to resiliently engage a groove 40 formed in the post 29 to thereby hold the bushing in the upper position. The bushing and pins 20 can be readily moved to the lower position by pushing downwardly on the handle 34 against the force of the spring 38 to thereby release the spring from the groove 40.

The upper end 41 of post 29 extends through an opening 42 in the bent portion 37 of handle 34. The height of the end 41 projecting above the handle portion 37 provides a visual indication to the operator as to whether the lift pins 20 are in the upper or lower position. As best shown in FIG. 6, when the handle is in the upper position, only a small section of end 41 projects through opening 42, but when the handle is down, as shown by the full lines, a larger section of end 41 extends through the opening and this enables the operator to see from a distance whether the device is in the manual or automatic position.

As best shown in FIG. 1, each cap is provided with a generally flat surface 43 which engages the flat surface of an adjacent cap and prevents rotation of the caps and assure alignment of the lift pins 20 and openings 21.

In operation, a suitable vacuum line, not shown, is connected to the bucket 1 to draw vacuum therein. The handle 34 at this time is in the position shown by the full lines in FIG. 6 and the lifting pins 20 are located out of contact with the ball valves 18 which are seated on the valve seats 17.

Figure 5:
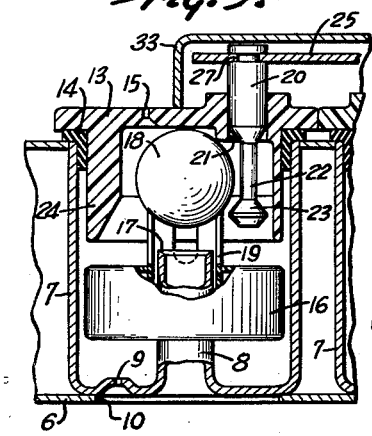
FIG. 5 is a view similar to FIG. 3 showing the ball valve in the open position and being held in the open position by the float.

To establish vacuum from the bucket 1 to the teat cups, the handle 34 is moved upwardly to thereby elevate the plate 25 and the lift pins 20. This results in the lower enlarged heads 23 of the lift pins to engage the ball valves, as shown in FIG. 4, to displace the ball valves from the valve seats. A vacuum is then established through nipples 12 to the teat cups. The teat cups are then initially applied to the cow's teats and are held there by the vacuum in the cups. After the milk has begun to flow into the cups, the floats 16 will rise until the projections or prongs 19 on the float engage the ball valves and maintain the valves in the open position, as shown in FIG. 5. The milk within the cup will overflow through the passages between the prongs and into the outlet tubes 8 to the bucket 1. The upper end 41 at this time will merely protrude only slightly through the opening 42 in the handle, indicating to the operator that the lift pins 20 are in the upper position. The operator may then return the handle 34 to its original position, as shown in the full lines in FIG. 6, and the pins 20 will thereby be returned to their original position. However, as the prongs 19 of floats 16 are engaged with valves 18, the valves will remain in the open position.

After the milking has been completed and the milk ceases to flow, the milk within the cup will flow from the cups through the drain outlets 9. The float will thereby be lowered until it seats on the drain outlet 9, and the ball valve 18 will seat on the valve seat 17 to cut off the vacuum. Atmospheric pressure will then be restored to the cup 7 through vents 15. The teat cup will then fall from the cow's teat or can be readily removed so that injury to the cow is prevented.

With the present invention, all of the operating mechanism for actuating the lift pins and displacing the valves to establish the vacuum, is contained on the outside of the cups and bucket in a location out of the milk zone. This simplifies the cleaning operation and produces a more sanitary milk supply. The use of the ball valves 18, in combination with the vertically moving lift pins 20, provides a simple yet effective means for initially opening the valves and establishing the vacuum. While the above description has shown the enlarged heads 23 of the pins being located below the horizontal centerline of the ball, it is contemplated that the lower end of the lift pins be located above the centerline of the ball and the pins moved downwardly to push the ball valves off of the valve seats. However, an increased force would be necessary in this latter method in order to unseat the balls.

The lifting mechanism is integral with the handle. When the lid is lifted off the bucket at the end of the milking operation, the pins 20 are thereby moved to their elevated position and the lid can be removed in a single operation.

The lift plate cover 33 not only serves to hold the plastic caps down on the cups, but also serves as an upper stop for the lifting handle and prevents the pins 20 from being pulled out of the caps. In addition, the handle passes through a slot in the cover and the slot serves as a guide for the vertical movement of the handle and prevents lateral movement of the handle and thus prevents torque on the pins.

The projecting end 41 not only serves as a visual indication to the operator as to whether the device is in the automatic or manual position, but in lifting the handle, the operator's thumb normally pushes down on the end 41. This increases the leverage of the pull on the handle and ensures that the force is applied to the proper location on the handle.

Various modes of carrying out the invention are contemplated as being within the scope of the following claims particularly pointing out and distinctly claiming the subject matter which is regarded as the invention.

I claim:

1. In a milking apparatus, a cup connected to an animal's teat and having an open end, a cover enclosing the open end of the cup, a tubular outlet disposed generally centrally of the cup and connected to a source of vacuum and the upper end of said outlet defining a valve seat, an annular float disposed around the outlet in said cup, a valve disposed to normally rest on the valve seat and adapted to open and close said outlet, said valve having a portion projecting laterally beyond said valve seat, an actuating member slidably disposed within an opening in the cover in said cup and being movable from an inoperative position to an operative position, said actuating member being disposed laterally outward in spaced relation to said valve when said actuating member is in the inoperative position and having a lower end extending laterally toward the axis of the tubular outlet to a location beneath said portion of said valve, and operating means disposed on the exterior of the cup and connected to the outer end of the actuating member for moving the actuating member vertically to bring said lower end into contact with said portion of the valve to thereby displace the valve from the valve seat and establish a vacuum to the cup to start the flow of milk.

2. In a milking apparatus, a cup connected to an animal's teat and having an open end, a cover enclosing the open end of the cup, a tubular outlet disposed generally centrally of the cup and connected to a source of vacuum and the upper end of said outlet defining a valve seat, an annular float disposed around the outlet in said cup, a spherical valve disposed to rest on the valve seat and adapted to open and close said outlet, a pin slidably disposed within an opening in the cover and being movable from an inoperative position to an operative position, said pin being disposed out of contact with the valve when the pin is in the inoperative position and having a stem portion and a lower enlarged head, and operating means disposed on the exterior of the cup and connected to the outer end of the pin for moving the pin vertically within the cover to bring the enlarged head into engagement with the periphery of the valve to displace the valve from the valve seat and establish a vacuum to start the flow of milk.

3. The structure of claim 2 in which the head of the lifting pin is located beneath a horizontal plane passing through the center of the spherical valve.

4. The structure of claim 3 including means disposed within the cup and located laterally outward and in spaced relation to said spherical valve for preventing complete displacement of the valve from the valve seat.

5. The structure of claim 2 including an annular skirt depending from the cover and spaced laterally outward of the valve separate from the cup to prevent complete displacement of the valve from the valve seat.

6. In an automatic shutoff apparatus for a milking system, a container, a lid for the container, a series of cups mounted on the lid with each cup having an outlet opening communicating with the container and having an inlet opening connected to an animal's teat, a cover for each cup, a valve disposed in each cup to open and close the outlet opening in the cup, a valve actuating member extending within each cup and having a lower portion selectively engageable with the respective valve for unseating the valve and establish a vacuum to the animal's teat and start the flow of milk and having an upper end located outside of the respective cup, a connecting member located on the upper surface of the lid and connected to the upper ends of the valve actuating members, a closure plate having a downwardly extending flange disposed in engagement with said covers, said closure plate extending over said connecting member and said valve actuating members to enclose the same, and means connected to the lid for holding the closure plate down against the covers.

7. The structure of claim 6 in which the periphery of the connecting member is provided with a series of slots with each slot removably receiving the upper end of a pin.

8. The structure of claim 6, in which the flange of the closure member is provided with an opening and a carrying handle extends through said opening and the portion of the closure member bordering the upper end of the opening serving as a stop to limit the upward movement of the handle.

References Cited by the Examiner

UNITED STATES PATENTS

| | | | |
|---|---|---|---|
| 1,725,280 | 8/29 | Kiefer | 119—14.46 |
| 1,916,513 | 7/33 | Jones | 119—72.5 |
| 2,027,458 | 1/36 | Tepas | 137—94 |
| 2,685,862 | 8/54 | Hill et al. | 119—14.08 |
| 2,836,148 | 5/58 | Eades | 119—14.43 |
| 2,887,986 | 5/59 | Golemon | 119—14.08 |
| 2,902,975 | 9/59 | Babson | 119—14.43 |
| 3,092,074 | 6/63 | Johnson | 119—14.46 |

SAMUEL KOREN, *Primary Examiner.*

ALDRICH F. MEDBERY, *Examiner.*